United States Patent [19]

Shinjo

[11] Patent Number: 4,998,853

[45] Date of Patent: Mar. 12, 1991

[54] SELF-DRILLING BLIND RIVET AND METHOD FOR MAKING SAME

[75] Inventor: Katsumi Shinjo, Osaka, Japan

[73] Assignee: Yugenkaisha Shinjo Seisakusho, Osaka, Japan

[21] Appl. No.: 463,558

[22] Filed: Jan. 11, 1990

[30] Foreign Application Priority Data

Jan. 25, 1989 [JP] Japan .................................. 1-15544

[51] Int. Cl.⁵ .............................................. F16B 13/04
[52] U.S. Cl. ........................................ 411/29; 411/70; 411/900
[58] Field of Search .................. 411/29, 30, 387, 900, 411/70, 43

[56] References Cited

U.S. PATENT DOCUMENTS

| 3,750,518 | 8/1973 | Raygurn | 411/29 |
| 3,935,786 | 2/1976 | Murray et al. | 411/29 |

FOREIGN PATENT DOCUMENTS

| 2244143 | 3/1973 | Fed. Rep. of Germany | 411/30 |
| 2549147 | 5/1977 | Fed. Rep. of Germany | 411/900 |
| 0005991 | 8/1988 | World Int. Prop. O. | 411/29 |

Primary Examiner—Neill R. Wilson
Attorney, Agent, or Firm—Antonelli, Terry, Stout & Kraus

[57] ABSTRACT

A self-drilling blind rivet includes a main body having a bore, a mandrel trapped in the bore of the main body, the mandrel including an abutment end toward the main body, and a drill bit welded to the abutment end of the mandrel, the drill bit including a cold forged drill section.

1 Claim, 3 Drawing Sheets

SELF-DRILLING BLIND RIVET AND METHOD FOR MAKING SAME

BACKGROUND OF THE INVENTION

The present invention relates to a self drilling blind rivet and a method for making same. More particularly, the present invention relates to a self drilling blind rivet including a mandrel adapted for carrying a short drill bit cold forged on a mass-production basis, and a method for making such drill bits on a mass-production basis.

The known self drilling blind rivet has a drill bit at the top end of a mandrel trapped inside of a hollow body. For example, Japanese Patent Publication No. 41—16724, No. 49—22967 and U.S. Pat. No. 4,293,258 disclose typical self drilling blind rivets of this type.

A disadvantage of these known rivets is the difficulty of mass-production and the increased production cost. More specifically, it is costly to make a one piece rivet in which a mandrel is trapped inside of the hollow body and provided with a drill having a larger diameter than that of the body. There is another method which makes short drill bits separately from the bodies and join them. However it is difficult to make short drill bits to exact dimensions. Although there is a large demand for blind rivets in the industry, the difficulty of mass production is a bottleneck in the supply.

SUMMARY OF THE INVENTION

Accordingly, an object of the present invention is to provide a self drilling blind rivet adapted for mass-production.

Another object of the present invention is to provide a method for mass-producing drill bits incorporated in a self-drilling blind rivet.

According to the present invention there is provided a self-drilling blind rivet which comprises a main body having a bore, a mandrel trapped in the bore of the main body, the mandrel including an abutment end toward the main body, and a drill bit welded to the abutment end of the mandrel, the drill bit including a cold forged drill section.

The drill bit is made of a blank having a post-like body having a diameter equal to that of the hollow main body, the post-like body having a knurled shank portion adjacent to the drill section, the end face of the knurled shank portion being perpendicular to the axis of the rivet.

According to another aspect of the present invention, there is provided a methold of making a self-drilling blind rivet, the method comprising the steps of preparing a post-like blank of low carbon steel having a flange, shaping a drill section in a lower section of the blank by cold forging, knurling a portion of the blank adjacent to the drill section, and crushing the flange of the blank and flattening the crushed flange so that the end face of the shank is perpendicular to the axis of the rivet.

Other objects and advantages of the present invention will become more apparent from the following detailed description, when taken in conjunction with the accompanying drawings which show, for the purpose of illustration only, one embodiment in accordance with the present invention.

DETAILED DESCRIPTION OF THE PREFERRED EMBODIMENT

Figure 1:
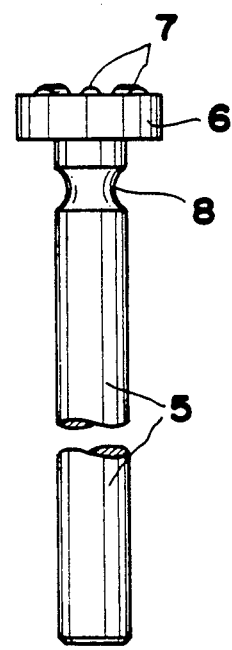
FIG. 1 is a front view showing a mandrel incorporated in a self-drilling blind rivet according to the present invention.
Figure 2:
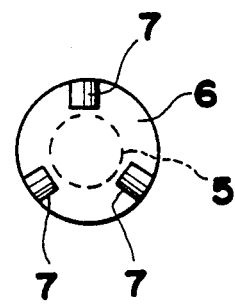
FIG. 2 is a plan view showing the mandrel of FIG. 1.
Figure 8:
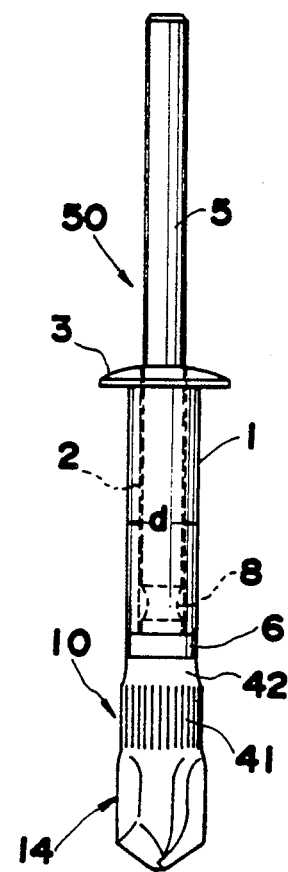
FIG. 8 is a front view showing a finished blind rivet.

Referring to FIGS. 1 and 2, a mandrel 5 incorporated in a blind rivet of the present invention includes a flange 6 of the same outside diameter of as that of a rivet body 1 having a bore 2 for accommodating the mandrel 5 and a head flange 3 made in one piece with the rivet body 1 (FIG. 8). The mandrel 5 has bulged welds 7 radially deposited on its top end face as best shown in FIG. 2 and a neck portion 8 having a restricted diameter adjacent to the flange 6. The neck portion 8 is to facilitate the tearing of this part. The flange 6 and the bulged welds 7 are formed by a known heading method.

Figure 3A:
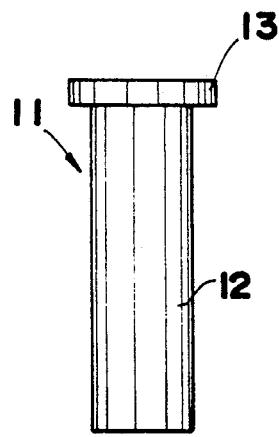
FIG. 3 (a), 3(b) and 3(c) are side views exemplifying the steps of shaping a drill bit joined to the mandrel.

Referring to FIGS. 3 (a) to 3 (c) the process of shaping a drill bit generally designated by the reference numeral 10. FIG. 3(a) shows a blank generally designated by the reference numeral 11 which includes a post-like body 12 having a diameter equal to the outside diameter d of the rivet body 1, and the flange 13 made in one piece with the post-like body 12. The flanges 13 are used in transporting and locating the blanks 11 when the drill sections 14 of blind rivets 1 are automatically cold forged and rolled. At the final stage the flanges 13 are crushed. The blanks 11 are made of low carbon steel. FIG. 3 (b) shows the step of shaping the drill section 14. A lower part of the post-like body 12 is cold forged between a pair of molds 21A and 21B. The molds 21A and 21B are provided with an uneven surface adapted to shape the drill section 14. While the blank 11 is pressed between the molds 21A and 21B the metal is squeezed and bulges in a scrap 20 along the periphery of the drill section 14.

Figure 3B:
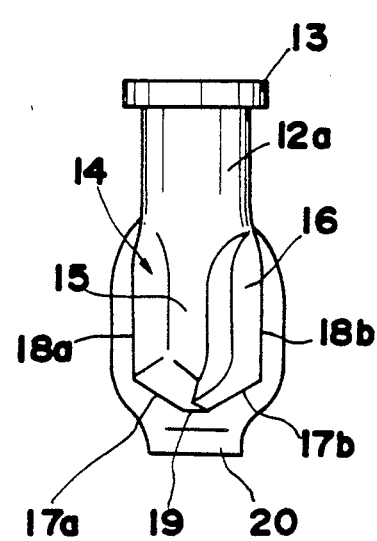
Figure 4:
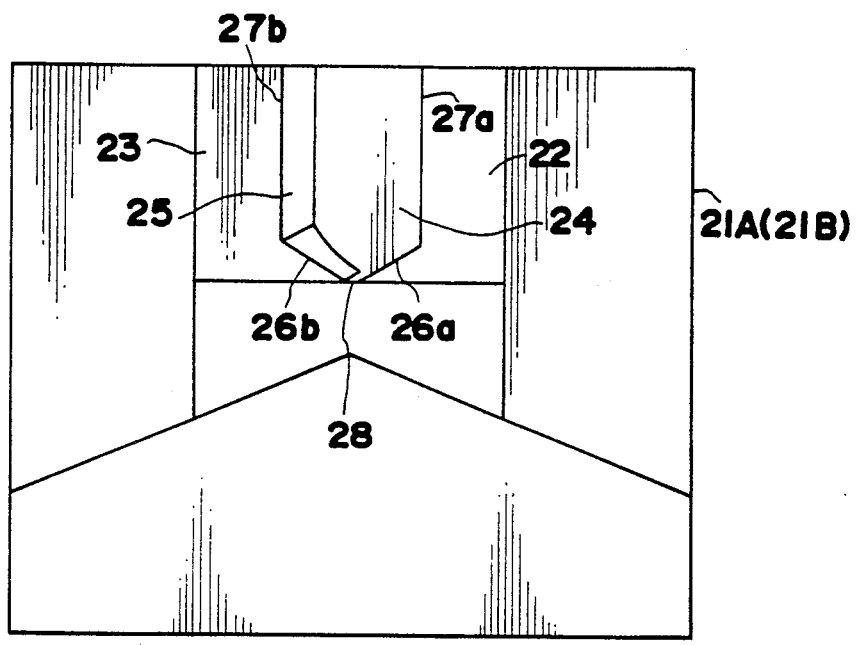
FIG. 4 is a front view showing a mold in which the drill section is shaped by cold forging.
Figure 5:
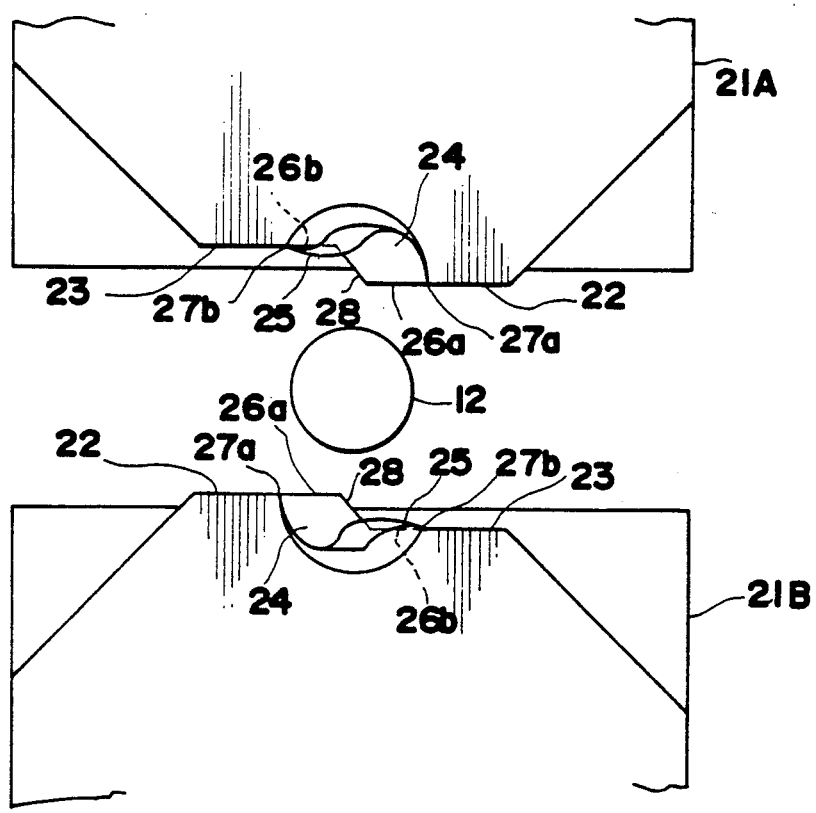
FIG. 5 is a plan view showing a pair of molds.

Referring to FIGS. 4 and 5, the molds 21A and 21B are symmetrically shaped. Each mold 21A, 21B has a first reference face 22 and a second reference face 23 with the interpostion of a step. A recess 24, designed to shape a land 15 of the drill section 14, is formed by reference to the face 22. A convex portion 25, designed to shape an elongated groove for allowing cutting ships to discharge, is formed by reference to the face 23. As shown in FIG. 3(b), the drill section 14 has two cutting edges 17a and 18a at one side and two cutting edges 17b and 18b at the other side. The cutting edges 17a and 18a are shaped by a first molding edge 26a and a second molding edge 27a, respectively. Both molding edges 26a and 27a are formed in the face 22. The other cutting edges 17b and 18b are shaped by the molding edges 26b and 27b, respectively. Both molding edges 26b and 27b are formed in the face 23. The molding edges 26a and 26b are linked by a ridge 28 which shapes a chisel edge 19.

Figure 3C:
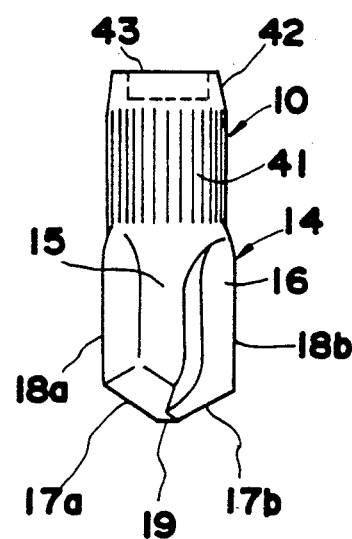

FIG. 3(c) shows a final drill bit 10 which has finished the molding and rolling process.

Figure 6:
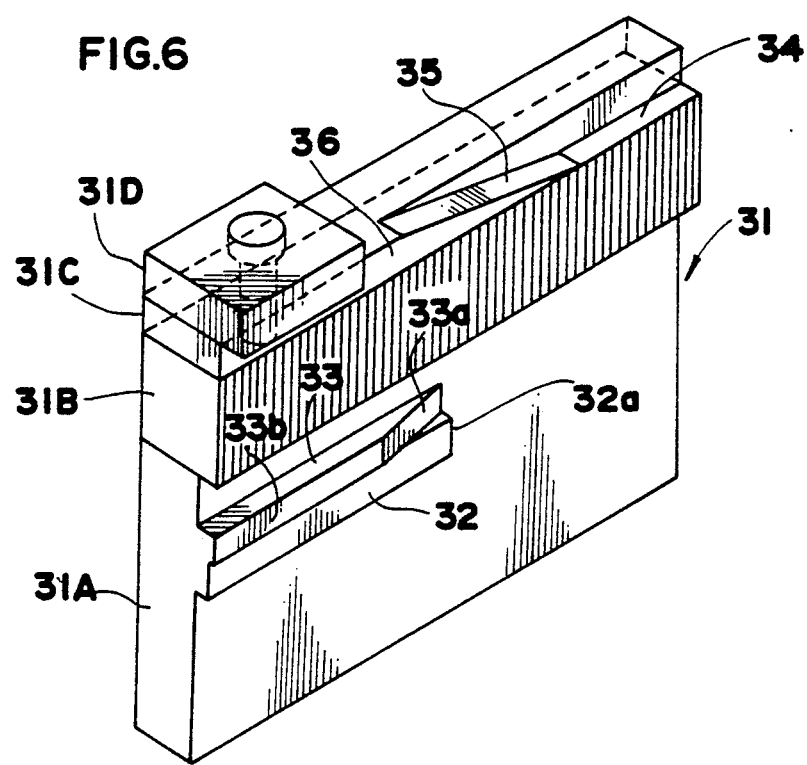
FIG. 6 is a perspective view showing a rolling die.

As shown in FIG. 6, a generally rolling die designated by the reference numeral 31 is provided with a die body 31A having a first ridge 32 for removing the scrap 20 in the drill section 14 and a second ridge 33 for crushing flashes, a vertically serrated knurling die 31B, a lapping die 31C for crushing the flange 13 and a flattening die 31D. The first ridge 32 has a step 32a at its terminating end, and the second ridge 33 has a slant portion 33a and a flat portion 33b. The lapping die 31C has a horizontal portion 34 for bearing the flange 13 and a slant portion 35 for pushing the flange 13 from below, and a steep side 36 for crushing the flange 13.

A pair of rolling dies 31 are opposed to each other with the blank 11 having a finished drill section 14 being interposed therebetween, wherein the flange 13 of the blank 11 is supported by the horizontal portion 34 of the die. In this state the rolling die 31 is rolled with respect to each other. The scrap 20 of the blank 11 comes into abutment with the step 32a, and is removed. Flashes (not shown) remaining after the removal of the scrap 20 are crushed by the slant portion 33a and the flat portion 33b of the ridge 33.

A shank 12a of the blank 11 is knurled by the knurling die 31B to have vertical or longitudinally extending serrations 41 so as to enable the blank 11 to withstand strong forces imparted to the blank 11 to deform the flange 13 in the axial direction and minimize slippage of the short post-like body relative to the rolling dies 31 during processing. The flange 13 of the blank is raised by the slant portion 35 of the lapping die 31C, and crushed by the steep side 36 until it is shaped into a tapered end 42 having a diameter virtually equal to the outside diameter of the head 6 of the mandrel 5. The tapered end 42 is finished by the flattening plate 31D. In this way a flat ring-shaped abutment end 43 is shaped which is at right angle to the axis of the drill section generally designated by the reference numeral 14 (accordingly, the axis of the rivet). Finally the drill bit 10 is carburized to attain sufficient strength.

Figure 7:
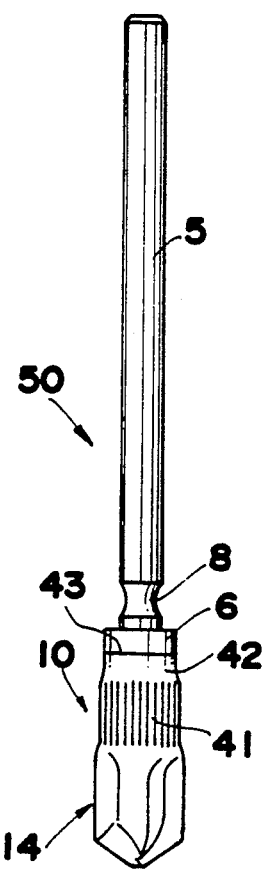
FIG. 7 is a front view showing a mandrel and a drill bit joined thereto.

As shown in FIG. 7, the self-drilling blind rivet generally designated by the reference numeral 50 is formed by joining the mandrel 5 to the finished drill bit 10, and the mandrel 5 is inserted into the bore 2 of the rivet body 1 (FIG. 8), with the flat ring-shaped abutment end 43 being brought into engagement with the flat end face of the flange 6 of the rivet body 1.

What is claimed is:

1. A self-drilling blind rivet comprising:

a rivet body having a bore extending therethrough;

a mandrel accommodated in said bore, said mandrel including an abutment flange having an outer diameter substantially equal to an outer diameter of said rivet body; and a drill bit including a substantially post-like drill body having a first end welded to said abutment flange of said mandrel and a second end, opposite the first end, including a drill section, a plurality of longitudinally extending knurled serrations provided about an outer surface of said drill body between said drill section and said first end, said drill body is provided with a tapering body section interposed between an end of said longitudinally extending serrations opposite the drill bit section and said first end of said drill body, wherein said tapering body section terminates in a flat ring-shaped abutment face extending substantially at a right angle to a longitudinal center axis of the drill section, abutting said abutment flange of said mandrel and having an outer diameter substantially equal to the outer diameter of said rivet body.

* * * * *